R. C. SWARTZWELDER.
BRAKE MECHANISM.
APPLICATION FILED NOV. 23, 1909.

994,286.

Patented June 6, 1911.

2 SHEETS—SHEET 1.

WITNESSES

INVENTOR
Richard C. Swartzwelder
by E. Wright
Att'y.

R. C. SWARTZWELDER.
BRAKE MECHANISM.
APPLICATION FILED NOV. 23, 1909.
994,286.
Patented June 6, 1911.
2 SHEETS—SHEET 2.
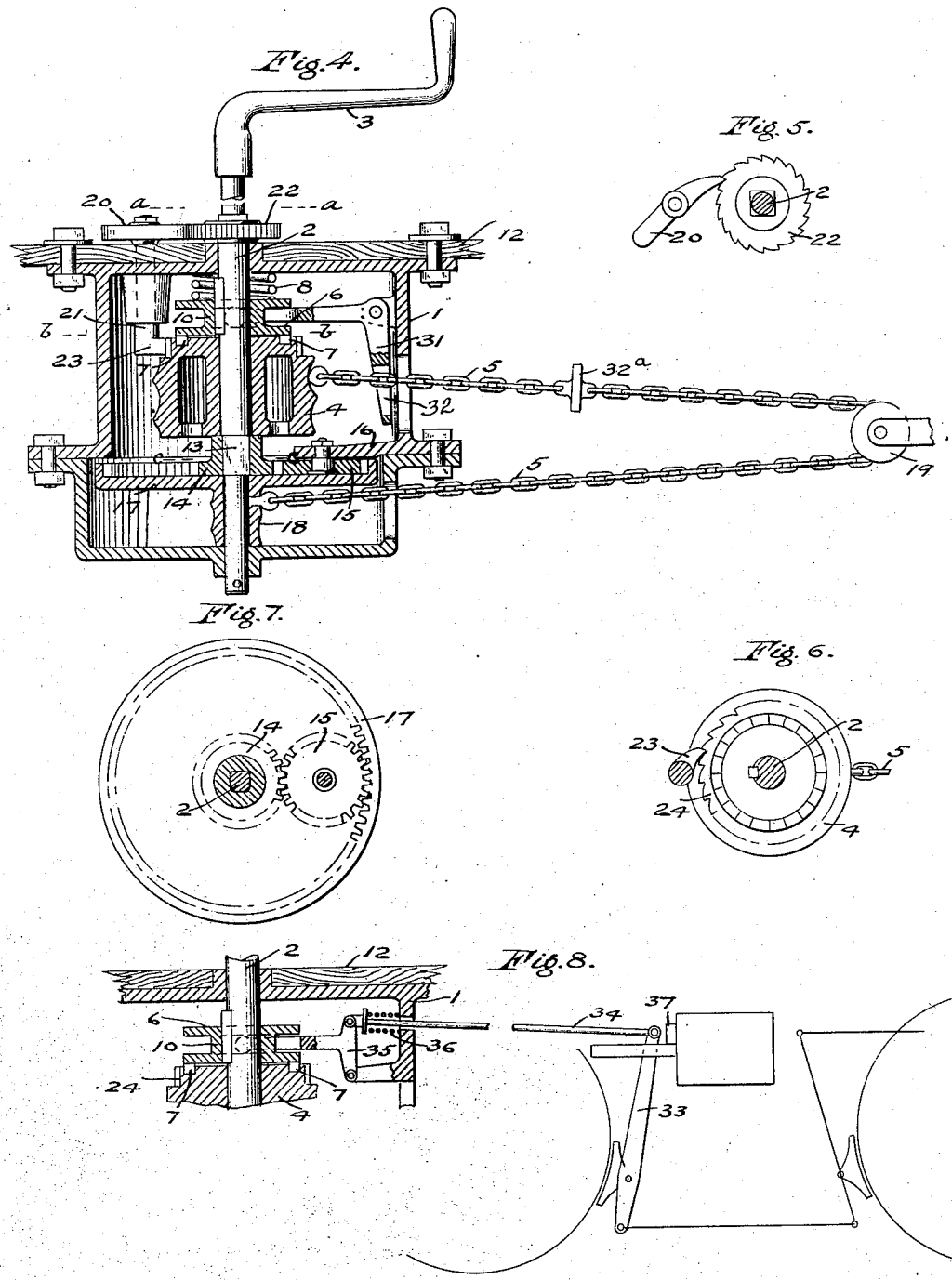

UNITED STATES PATENT OFFICE.

RICHARD C. SWARTZWELDER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

BRAKE MECHANISM.

994,286.      Specification of Letters Patent.    Patented June 6, 1911.

Application filed November 23, 1909. Serial No. 529,525.

*To all whom it may concern:*

Be it known that I, RICHARD C. SWARTZWELDER, a citizen of the United States, residing at Edgewood, in the county of Allegheny and State of Pennsylvania, have invented new and useful Improvements in Brake Mechanism, of which the following is a specification.

This invention relates to railway brakes, and more particularly to a hand operated brake for electric traction or steam service.

The principal object of my invention is to provide an improved brake mechanism of the above character adapted to apply the brakes with a minimum movement of the brake handle while securing maximum braking power. For this purpose I contemplate providing two winding drums, one of which is adapted to rapidly take up the slack and apply the brake shoes to the wheels, the other drum being adapted to apply the brakes powerfully, and means for cutting the first mentioned drum out of action either manually at will of the operator, automatically according to the braking pressure exerted, or dependent on the movement of the brake rigging or otherwise.

Figure 1:
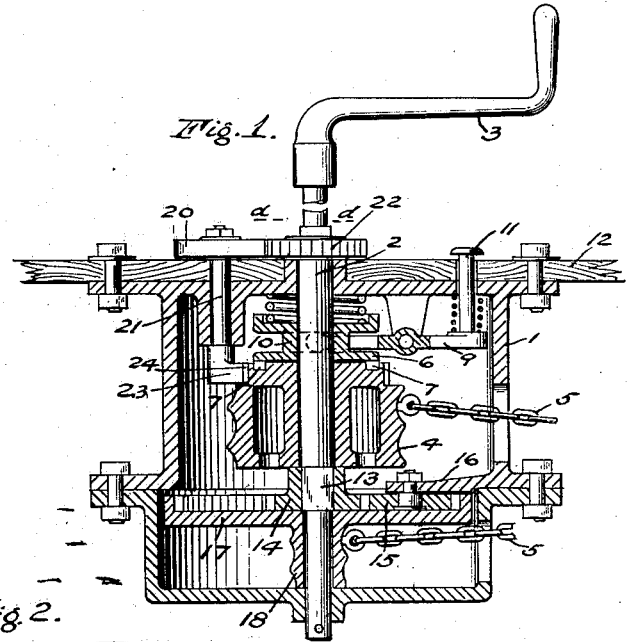
Figure 2:
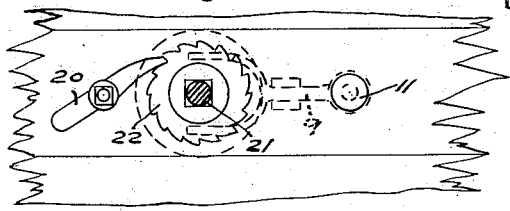
Figure 3:
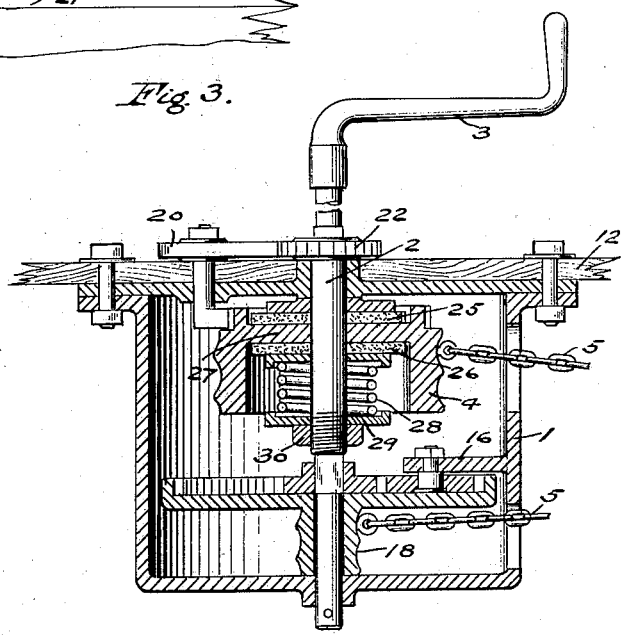

In the accompanying drawings, Figure 1 is a vertical section of a brake mechanism embodying my improvement; Fig. 2 a section on line *d—d* of Fig. 1; Fig. 3 a vertical section of a slightly modified construction embodying my invention; Fig. 4 a similar view illustrating still another modification; Fig. 5 a section on line *a—a* of Fig. 4; Fig. 6 a section on line *b—b* of Fig. 4; Fig. 7 a section on line *c—c* of Fig. 4; and Fig. 8 another modified construction embodying my improvement.

According to the construction shown in Fig. 1, a suitable casing 1 may be provided having bearings for a brake staff 2 carrying the usual operating handle 3. Loosely mounted on the staff 2 is a large winding drum 4 having a brake chain 5 attached thereto and provided with a clutch device for connecting the same to the brake staff. Various forms of clutches may be employed, but in the present construction I have shown a positive clutch member 6 keyed or otherwise rotatively secured to the staff but adapted to slide longitudinally on the staff. On one face of the clutch member are projections 7 adapted to engage in corresponding recesses in the drum 4 and a spring 8 is interposed between the casing 1 and the clutch member 7, the pressure of which tends to force the projections 7 into the recesses of the drum. A pivotally mounted operating fork 9 straddles a reduced annular section 10 of the clutch member 7 and the outer end of this fork is adapted to be acted upon by a foot treadle 11, extending above the level of the car platform 12, so that by pressing the foot on the treadle the clutch 7 may be raised out of engagement with the drum 4. The staff 2 is provided with a squared portion 13 carrying a pinion 14 adapted to mesh with a gear 15 secured to an arm 16. The gear 15 meshes with an internal gear 17 having a small drum 18 to which is attached one end of the brake chain 5, said chain being in the form of a loop passing over a pulley 19 connected to the brake rigging, as shown in Fig. 4. A pawl 20 secured to a shaft 21 engages with the teeth of a ratchet wheel 22 and is adapted to be operated by the foot in the usual manner. On the lower end of the shaft 21 is secured a second pawl 23 adapted to coöperate with a ratchet wheel 24 on the drum 4, so as to prevent the drum from turning back when the chain 5 is wound thereon.

In operation, if it is desired to apply the brakes, the handle 3 is turned in a clockwise direction and as the projections 7 of the clutch 6 engage in the recesses of the drum 4, the latter is rotated and the chain 5 is wound thereon. The pinion 14 is also rotated by the shaft 2 and through the gear 15 rotates the internal gear 17 in the opposite direction, thus winding the chain 5 on the small drum 18. Upon winding up the chain to a point where the brake shoes are brought into engagement with the wheels, the treadle 11 is pressed down, disengaging the clutch 6 from the drum 4, the drum being prevented from turning back by the pawl 23. It will now be clear that further turning of the handle 3 only operates the drum 18 through the connecting gears, and as this drum is small, the brake shoes may be applied with great force to the wheels. The brakes may be released in the usual manner by throwing out the pawl 20, thereby allowing the drums 4 and 18 to turn back so as to let out the brake chain 5. The brake shoes are thus quickly brought into engagement with the wheels by the action of the two winding drums, while a high degree of braking pressure is secured thereafter by the means of the increased leverage obtained from the small diameter drum 18, the reducing gears, and the taking up of the chain over the pulley 19.

In Fig. 3 of the drawings, a modified construction is illustrated whereby the winding of the chain is automatically controlled according to the braking pressure exerted on the winding chain and for this purpose suitable friction disks 25 and 26 are secured to the staff 2 and between the disks a friction plate 27 of the drum 4 is adapted to operate, a spring 28 being interposed between a fixed collar 29 on the staff 2 and the friction disk 26 so as to press the friction elements together with a certain predetermined pressure, which pressure may be varied by adjusting the nut 30 on the staff. With this construction, upon turning the handle 3 to apply the brakes, the two winding drums are rotated to draw up the chain 5, until the pull of the chain exceeds the frictional resistance of the friction disks on the plate 27, then the drum 4 ceases to rotate and further movement of the handle 3 causes rotation of the small drum only. The operation is thus similar to that of the construction shown in Fig. 1, but the drum 4 is here automatically cut out of operation without any action on the part of the operator.

In Fig. 4, a construction is shown in which the clutch 6 is operated upon a predetermined movement of the chain, such as sufficient to bring the brake shoes to the wheels. In this case the operating fork for the clutch is made in the form of a bell crank 31 having an opening 32 through which the chain 5 passes. On the chain 5 is secured a projection or obstruction 32ª adapted when the chain is wound up on the large drum 4 a certain distance to engage the crank 31, so that a further movement of the chain operates to shift the crank and thereby throw out the clutch 6. The projection 32ª is preferably so located on the chain 5, that the slack of the brake rigging is taken up and the brake shoes brought to the wheels upon the engagement of the projection with the crank 31. The operation of this form of my invention will be evident without further description. With this form of apparatus, a slack adjuster should be employed for the purpose of maintaining the brake shoe and wheel clearance uniform regardless of wear, so as to insure that the movement of the projection 32 to the lever 31 will always be sufficient to take up the slack and apply the brake shoes to the wheels.

Still another modification is illustrated in Fig. 8, in which a positive clutch is employed and the operation thereof is governed by the pressure exerted in applying the brakes. Fig. 8 shows a car truck diagrammatically and instead of having the dead end of the brake lever 33 fixed, the same is connected to one end of a rod 34 extending into the casing 1. The opposite end of the rod 34 is connected to a rocker arm 35 carrying the operating fork for the positive clutch 6. Between the casing 1 and the arm 35 is a spring 36 adapted to resist a certain predetermined pressure exerted through the rod 34. A stop 37 is located in the path of the lever 33 to limit the movement of the lever while permitting sufficient movement of the rod 34 so as to shift the clutch 6 out of engagement with the drum 4. Upon applying the brakes with this construction, both drums wind up the brake chain as in the other constructions until the pressure of the brake shoes on the wheels transmitted through rod 34 exceeds the resistance of spring 36, then the spring is compressed and the brake lever 33 moves over to its stop 37, thereby actuating the arm 35 and throwing out the clutch 6. Further movement of the operating handle then applies the brake shoes to the wheels through the action of the small winding drum, the stop 37 serving as a fulcrum for the brake lever 33. The gearing between the brake staff and the small drum need not necessarily be employed, as the small drum may be connected directly to the brake staff, but the gearing is preferably employed so as to provide a higher power ratio than could be obtained with the drum alone.

Having now described my invention, what I claim as new and desire to secure by Letters Patent, is:—

1. In a brake mechanism, the combination with one winding drum for taking up slack and applying the brake shoes to the wheels and another winding drum for applying the brake shoes with the maximum power, of means for cutting the first mentioned winding drum out of action.

2. In a brake mechanism, the combination with two winding drums for applying the brake shoes to and exerting a pressure on the wheels, of means for automatically cutting one winding drum out of action.

3. In a brake mechanism, the combination with one winding drum for taking up slack and applying the brake shoes to the wheels and another winding drum for applying the brake shoes with the maximum power, of means operating automatically for cutting the first mentioned winding drum out of action.

4. In a brake mechanism, the combination with one winding drum for taking up the slack and applying the brake shoes to the wheels and another winding drum adapted to apply the brake shoes to the wheels with the maximum braking power, of means governed by the degree of force exerted in braking for throwing the first mentioned drum out of operation.

5. In a brake mechanism, the combination with one winding drum for taking up the slack and applying the brake shoes to the wheels and another winding drum adapted to apply the brake shoes to the wheels with the maximum braking power, of means operating at a predetermined degree of braking pressure for cutting the first mentioned drum out of action.

6. In a brake mechanism, the combination with one winding drum for taking up the slack and applying the brake shoes to the wheels and another winding drum adapted to apply the brake shoes to the wheels with the maximum braking power, of a clutch device for connecting up the first mentioned drum to apply the brakes and means governed by the pressure exerted in applying the brakes for operating said clutch device to disconnect said drum.

7. In a brake mechanism, the combination with two winding drums primarily operating to take up the slack and apply the brake shoes to the wheels, of means adapted to automatically throw one of said drums out of action upon the braking pressure attaining a predetermined degree.

8. In a brake mechanism, the combination with two winding drums primarily operating to take up the slack and apply the brake shoes to the wheels, of a clutch device normally connecting up one of said drums and means dependent on a predetermined action of the brakes for operating said clutch device to throw said drum out of action.

9. In a brake mechanism, the combination with a device for applying the brake shoes to the wheels, of means for automatically varying the braking power according to the degree of pressure exerted in applying the brakes.

In testimony whereof I have hereunto set my hand.

RICHARD C. SWARTZWELDER.

Witnesses:
 WM. M. CADY,
 A. M. CLEMENTS.